United States Patent

Bull

[19]

[11] 4,290,092
[45] Sep. 15, 1981

[54] LAMP ASSEMBLY LIGHT SHIELD AND RETAINING MEANS

[75] Inventor: David W. Bull, Hersey, Mich.

[73] Assignee: Nartron Corporation, Reed City, Mich.

[21] Appl. No.: 69,704

[22] Filed: Aug. 27, 1979

[51] Int. Cl.³ ............................................. B60Q 3/04
[52] U.S. Cl. .................................. 362/61; 339/90 F; 339/97 L; 339/99 L; 362/368
[58] Field of Search ............... 362/368, 61; 339/14 T, 339/97 L, 99 L, 90 F

[56] References Cited

U.S. PATENT DOCUMENTS 1,871,748  8/1932  Schramm ............................ 362/61
4,118,764 10/1978  Bleiweiss et al. ................... 362/61

*Primary Examiner*—Edward A. Miller
*Assistant Examiner*—Irwin Gluck
*Attorney, Agent, or Firm*—Lon H. Romanski

[57] ABSTRACT

A lamp assembly, such as an indicator or illuminator type, has a main body structure detachably securable to an associated support as, for example, an instrument panel of a related vehicle, with such body structure enabling the easy connection thereto of an associated light shield; the body structure carries a separately formed resiliently deflectable detent member enabling easy assembly and disassembly of the shield with respect to the body structure as well as an infinite selection of angular adjustment of the shield relative to body structure.

12 Claims, 5 Drawing Figures

LAMP ASSEMBLY LIGHT SHIELD AND RETAINING MEANS

BACKGROUND OF THE INVENTION

Generally, in the automotive field, especially with regard to trucks, indicator lamp assemblies are employed as to indicate, by their respective energization, that certain selected functions or vehicular operating parameters are in an unacceptable condition. For example, as in a truck, such indicator lamp assemblies may be operatively connected to related sender units which are, in turn, responsive to indicia of engine oil level, engine temperature, loss of engine coolant, generator or alternator output level, actuation or operation of anti-skid mechanism, air pressure in truck oil tanks, headlamp selection (whether high or low beam), or parking brake engagement. Such indicator lamp assemblies often have a lens which emits a colored light upon energization of a bulb carried by the indicator lamp assembly and generally covered or contained by such lens.

There are other lighting requirements within, for example, the truck and especially along the instrument panel thereof. Often there is a need to have a continuous (or switchable) light source for illuminating a desired area as within the truck operator's compartment. This may be to illuminate certain controls which the operator may want to be able to quickly identify during night driving or to illuminate certain gauges or the like. The use of such a continuous illuminating light source as proposed by the prior art has presented problems in that often because of the light rays eminating therefrom in somewhat random direction the lenses of the related indicator assemblies would, in turn, be struck by such light rays and appear to indicate that the related indicator lamp assembly was energized when, in fact, it was not.

In an attempt to overcome this random light ray problem, hood-like structures were employed by the prior art in an attempt to control the path of the illuminating light rays. However, such prior-art hood-like structures, of necessity, were and are relatively large requiring the mounting thereof to, for example, the related lamp structure as by a collar like retainer and for threaded attachment means. Another problem of such prior art hoods is that once affixed to the related lamp assembly, the hood is fixed against further selective adjustment without employing, for example, tools and the like for first loosening the related attachment means. Further, the prior art illuminator hoods are not compatible with standard lamp body or socket structures. That is, they are usually limited to particular physical configurations of a lamp body and, more often than not, actually comprise a portion of a specially designed and built illuminator lamp assembly.

Accordingly, the invention as herein disclosed and claimed is primarily directed to the solution of the foregoing as well as other related and attendant problems.

SUMMARY OF THE INVENTION

According to the invention, an illuminator type lamp assembly comprises lamp body means, means formed on the lamp body means for enabling the lamp body means to be detachably secured to associated support structure, said lamp body means having a first open end for permitting the extension therethrough of an associated lamp bulb, a light shield generally covering said lamp bulb, said light shield having an opening formed in a wall portion thereof for the passage of light rays therethrough, and resilient detent means for operatively engaging said lamp body means for detachably holding the light shield in assembled relationship to said lamp body means and for enabling selective adjustable rotation of said light shield with respect to said lamp body means for achieving a selective direction of the light rays through said opening in said wall.

Various general and specific objects, advantages and aspects of the invention will become apparent when reference is made to the following detailed description considered in conjunction with the accompanying drawings.

BRIEF DESCRIPTION OF THE DRAWINGS

In the drawings wherein for purposes of clarity certain details and/or elements may be omitted from one or more views.

DETAILED DESCRIPTION OF THE PREFERRED EMBODIMENT

Figure 1:
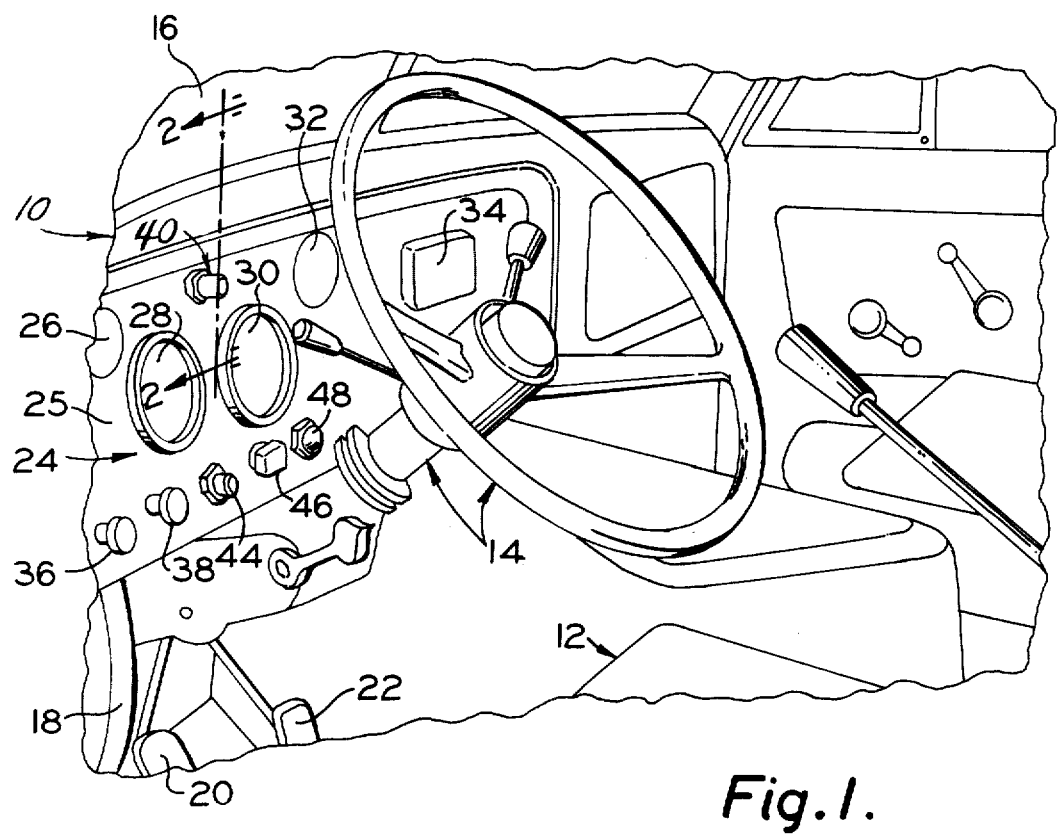
FIG. 1 is a fragmentary perspective view of an interior of a truck cab having an instrument panel employing an illuminator lamp assembly, in turn, employing teachings of the invention.

Referring now in greater detail to the drawings, FIG. 1 illustrates the interior of a truck cab 10 as being comprised of, for example, a driver's or operator's seat assembly 12, steering wheel and column assembly 14, windshield 16, operator's foot actuated levers and pedals 18, 20 and 22, and instrument panel assembly 24 comprising a panel-like support 25 and an array of gauges 26, 28, 30, 32 and 34, controls 36, 38, a plurality of indicator lamp assemblies 44, 46 and 48 and an illuminator lamp assembly 40.

Figure 2:
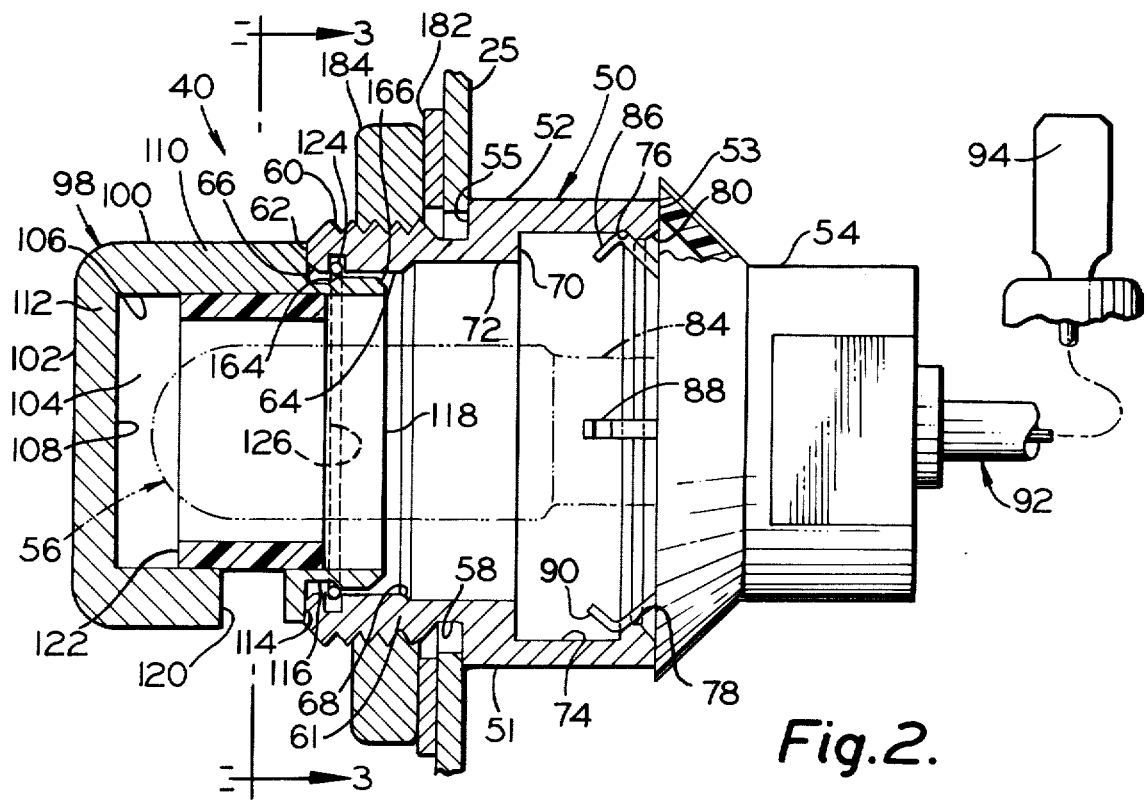
FIG. 2 is an enlarged view, partly in cross-section, taken generally on the plane of line 2—2 of FIG. 1 and looking in the direction of the arrows.

Referring in greater detail to FIG. 2, the illuminator lamp assembly 40 is illustrated as comprising lamp or bulb housing means 50 which, in turn, may be comprised of separable housing sections or housing body portions 52 and 54. The housing portion 52 may be generally tubular having a relatively large outer cylindrical surface 51 terminating at the right end in an annular transverse end abutment surface 53 and terminating at the left end in a flange-like or shoulder surface 55 formed as by a diametrically necked-down portion 58. The left end of the body portion 52 may have an externally threaded portion 60 which extends from the necked-down portion 58 and terminates at its left in an annular transverse second end abutment surface 62.

A first clearance type passageway 64 within body portion 52 is axially defined as by oppositely inclined annular ramp surfaces 66 and 68. As is evident from the drawings, ramp means 66 and 68 are so formed as to increase in effective diameter as such ramp means extend away from clearance passageway 64.

The second or inner ramp means 68, as it generally radiates away from passageway 64, terminates and/or blends into a second clearance passageway 72 which, as illustrated, may terminate in a radially outwardly directed shoulder or wall portion 70 formed as by a third further enlarged clearance passageway 74.

As depicted, clearance passageway 74, at its right or rearward end, may terminate as in a third generally radially inwardly directed annular incline or ramp surface 76 which, at its radially innermost end terminates as in a fourth clearance passageway 78. Similar to ramp surface 66, a generally annular incline or ramp surface 80 extends from clearance passageway 78 generally radially outwardly until it terminates in transverse end abutment surface 53.

Body or housing portion 54 may actually comprise a socket assembly formed of electrically non-conductive plastic material with a suitable centrally located cylindrical recess formed therein, as is well known in the art, adapted to receive therein the mail plug-in portion 84 of a bulb assembly 56. Also, as is well known in the art, the male plug-in portion 84 may be of the bayonet lock type wherein a tab or lug carried at the side of portion 84 becomes locked against an electrically conductive member within the bulb-receiving recess while a spring loaded contact at the end of the recess engages the end of the portion 84 to thereby complete a circuit through and with bulb 56. As is further well known in the art, the electrically conductive member within the bulb-receiving recess may be physically and electrically connected to a plurality of generally annularly positioned detentlike resilient latching arms, three of which are shown at 86, 88 and 90, each effectively secured to body or housing portion 54. The detent or latching arms may be electrically conductive so that the grounding circuit can be affected as through body portion 52 and panel 25. As generally illustrated, an elongated wire harness 92 (in the embodiment of FIG. 2 such harness comprises a single electrical conductor) is operatively electrically connected at its inner end to the spring loaded contact within body portion 54 while the other end of harness 92 is provided with a suitable terminal contact 94 engageable with related wiring of, for example, the truck cab 10.

In the lamp housing means 50 depicted in FIG. 2, when housing portion 54 is brought toward cooperating housing portion 52, the forward inclined portions of latching arms 86, 88 and 90 operatively engage ramp surface 80 and, upon continued applied force, latching arms 86, 88 and 90 will resiliently deflect radially inwardly as to thereby pass through clearance passageway 78. Once such arms 86, 88 and 90 pass through the clearance passageway, the said latching arms, under their own inherent resilient force, move radially outwardly thereby causing the rearward inclined portions of such latching arms to respectively engage the ramp or annular locking surface 76. The dimensions and configurations of the respective cooperating elements would preferably be such as to cause forward end surface 96 of housing portion 54 to be in abutting relationship with housing end surface 53 prior to latching arms 86, 88 and 90 dissipating all of the inherent resilient force thereby assuring a sound latched engagement as between housing body portions 52 and 54.

As should be apparent, the invention as herein disclosed is not restricted to lamp or bulb socket or body means comprised of two or more separable housing sections or portions. The invention may be practiced equally well where the related lamp or bulb socket or body means comprises a single unitary structure.

Figure 3:
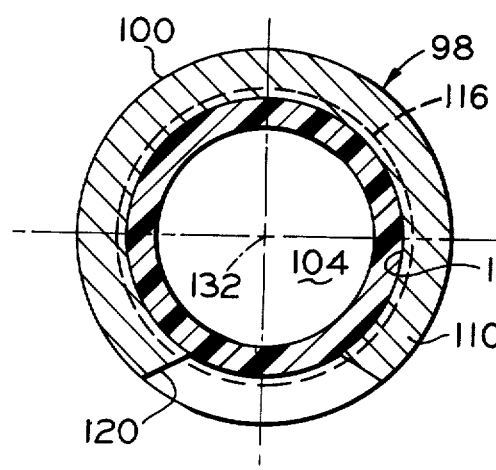
FIG. 3 is a cross-sectional view taken generally on the plane of line 3—3 of FIG. 2 and looking in the direction of the arrows.
Figure 4:
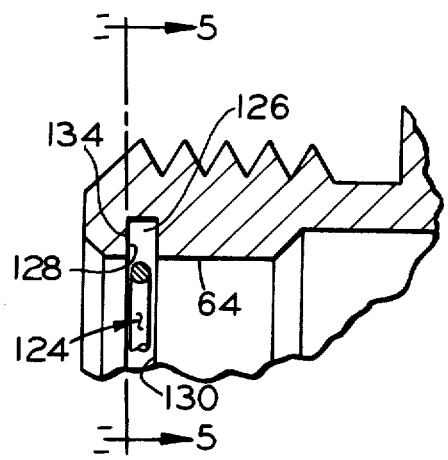
FIG. 4 is an enlarged view of a fragmentary portion of structure shown in FIG. 2.
Figure 5:
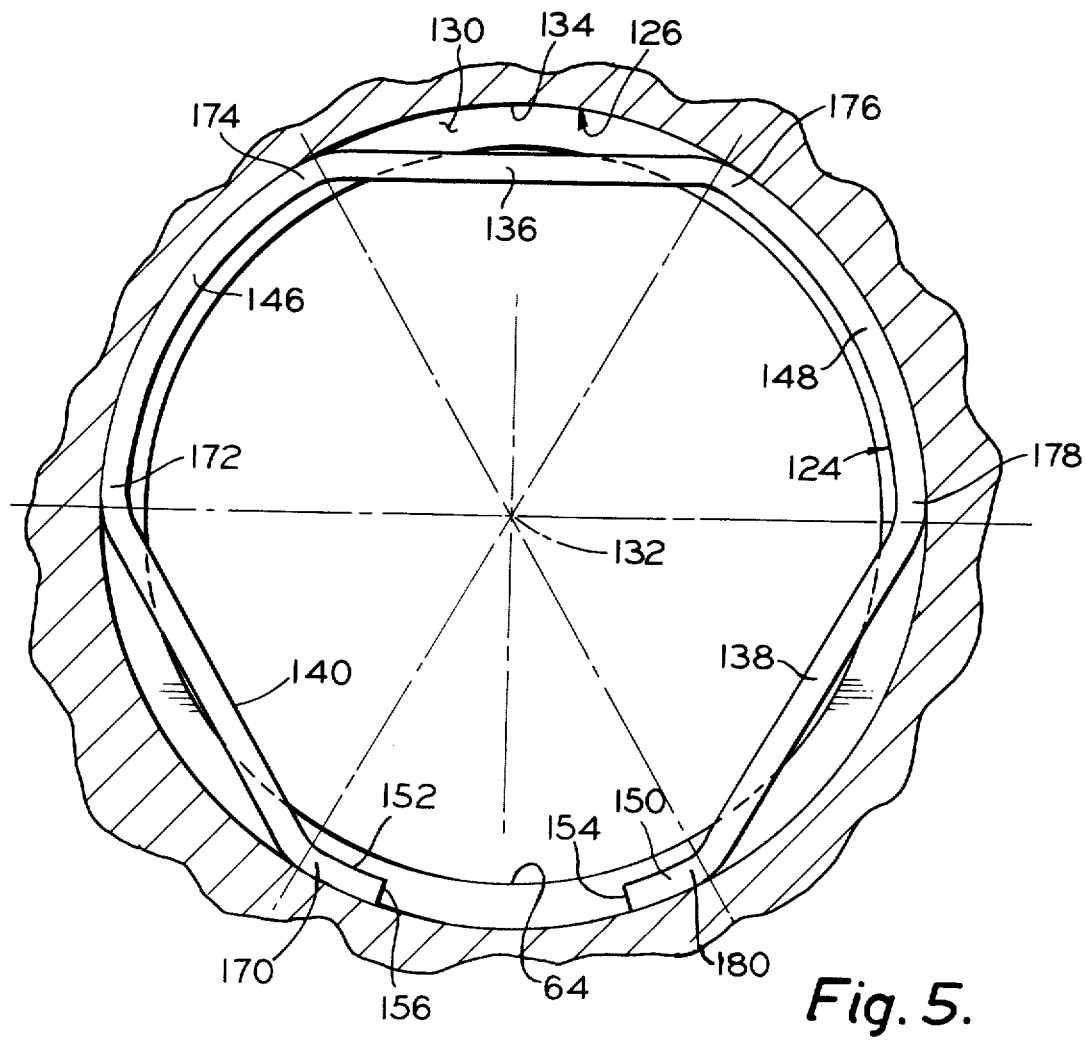
FIG. 5 is a cross-sectional view taken generally on the plane of line 5—5 of FIG. 4 and looking in the direction of the arrows.

FIG. 2, as well as FIGS. 3, 4 and 5, illustrate a light or lamp shield structure 98. In the embodiment disclosed the shield 98 is of a generally cup-like configuration having a first outer cylindrical surface 100 which terminates at or blends into a generally transverse forward or outer end surface 102. Further, in the preferred embodiment, the interior of shield structure 98 is provided with a chamber 104 which may have generally cylindrical surface 106 and which, at its left (as viewed in FIG. 2) or outermost end terminates as in an inner generally transverse surface 108. As can be seen, preferably walls 110 and 112, which respectively define surfaces 100, 106 and 102, 108, are formed integrally with each other. Although not so limited, in the preferred embodiment of the invention shield structure 98 is formed of metal such as, for example, an aluminum alloy.

Still referring to FIG. 2, wall 110 has an annular generally radiating flange or abutment surface 114 which, at its radially inner end, terminates as in a generally tubular extension 116 which, along with the inner cylindrical surface 106, terminates at its inner or right end (as viewed in FIG. 2) in a generally transverse end surface 118. The wall 110 also has a slot-like opening 120 formed therein for permitting the passage of light therethrough. Further, in the preferred embodiment, a generally tubular light filter 122 is carried within chamber 104. In this regard it is preferred that the relative dimensions of light filter 122 and surface 106 be such as result in a slight interference fit therebetween as to have light filter 122, in effect, press-fitted into chamber 104. Such filter 122 may be made of any suitable material such as, for example, translucent polycarbonate. As shown in FIGS. 2, 4 and 5, a generally resilient retainer member 124 is carried by body portion 52 as within an annular groove 126 formed into the body of portion 52 as through surface 64.

Referring in greater detail to FIGS. 4 and 5, each of which is in a relatively substantially enlarged scale, the groove or annular recess 126 is preferably formed as to have opposed annular wall surfaces 128 and 130 which are preferably substantially parallel to each other and generally normal to the axis 132 of body member 50 and shield 98. The side walls 128 and 130 each terminate, as at their radially outermost portion, in a generally cylindrical wall surface 134.

As shown in FIGS. 4 and 5, in the preferred form, retainer 124 is generally circular in transverse cross-section (FIG. 4) and formed into a generally hexagonal configuration (FIG. 5). As can be seen in FIG. 5, the retainer 124, preferably formed of tempered spring steel, comprises a plurality of generally straight or chordal portions 136, 138 and 140 which, as depicted, are integrally joined to arcuate portions 146, 148, 150 and 152. Further, as also illustrated, arcuate portions 150 and 152 terminate as at respective ends 154 and 156 normally spaced from each other.

As can be seen, the generally arcuate portions 152, 146, 148 and 150 limit the degree of translational movement which retainer 124 may freely experience relative to the tubular extension portion 61 of body 52 by abutting engagement with groove or recess outer surface 134. In the preferred embodiment, the relative dimensions are such as to result, when arcuate portions 146, 148, 150 and 152 are in abutting engagement with confining surface 134, in chordal portions 136, 138 and 140 extending, generally chordally, as to have at least a portion of each of such chordal segments 136, 138 and 140 disposed radially inwardly of clearance passageway defined by annular inner surface 64 which, in effect, functions as a pilot-like portion for shield tubular extension portion 116.

With reference to FIG. 2, it can be seen that such extension 116 is provided with an enlarged annular portion defining an outer cylindrical surface 162 which closely approaches the diametrical dimension of passageway 64. Further, annular ramp-like surfaces 162 and 166 are formed at either axial ends of cylindrical surface 162.

At the shield 98, assumed to be at this time separated from housing means 50, is brought toward housing portion 52 for assembly thereto, the chordal portions 136, 138 and 140 of retainer 124 will engage the axially outer-most ramp surface means 166 and, upon further applied force and movement of shield 98 towards housing section 52, ramp means 166 causes the respective retainer segments 136, 138 and 140 to move generally radially outwardly away from axis 132. When thusly sufficiently radially expanded, the enlarged annular portion and surface 162 of shield tubular extension 116 pass therethrough with the retainer segments 136, 138 and 140 being continually in frictional sliding engagement therewith. When shield 98 has been thusly moved a sufficient amount axially, the ramp surface means 164 thereof is presented to the retainer 124 and the chordal segments 136, 138 and 140 thereof, because of the previously induced resilient deflection, move generally radially inwardly and in doing frictionally engage such ramp or locking surface means 164. Preferably, prior to retainer means 124 reaching its normal state, as generally depicted in FIG. 5, abutment or shoulder surface 114 of shield 98 engages forward cooperating end surface 62 of body portion 52. Accordingly, retainer means 124, simultaneously pressing against recess wall 128 and ramp or locking surface means 164, serves to tightly hold shield 98 in assembled relationship to housing means 50.

The retaining arrangement herein disclosed is particularly suitable in those instances where the respective components are relatively quite small and do not permit a conventional type of detent locking or latching means because of size limitations. For example, in one successful embodiment of the structure herein disclosed: the nominal diameter of surface 162 was 0.520 inch; the nominal diameter of cylindrical groove surface 134 was 0.580 inch; the width of groove or recess 126 (the distance between walls 128 and 130) was 0.020 inch; the nominal transverse cross-sectional diameter of retainer 124 was 0.015 inch; the nominal radial distance from the axis 132 to the radially innermost portion of each of the chordal sections 36, 38 and 40 of retainer 124 (in its normal or free state shown in FIG. 5) was 0.245 inch; and the nominal diameter of cooperating clearance passageway 64 was 0.530 inch. It should be apparent that with such working dimensions, especially where a clearance aperture is only 0.530 inch in diameter and one has to pass a thin walled tubular member therethrough and yet provide a means of detachably locking such tubular member within the clearance passageway, that the prior art means of flat stock C-clip type retainers or the like simply are not employable because of, among other things, the space required to achieve the necessary degree of deflection. In the arrangement disclosed, especially when viewing FIG. 5, it can be seen that as the retainer chords are forced generally radially outwardly that the mid-portions of chords 36, 38 and 40 will undergo some resilient bowing generally in the direction of the annular confining surface 134 and, in so doing, will cause a fulcrum-like situation to occur as at the juncture portions 170, 172, 174, 176, 178 and 180 these being where the arcuate portions and the chordal portions of the retainer are, in pairs, integrally joined to each other. Considering, for example, chordal portion 136, junctures 174 and 176 and arcuate portions 146 and 148 (FIG. 5) it can be seen that as, for example, the mid portion of chordal section 136 is deflected radially outwardly that there is a moment-like force or couple created generally about juncture 174 and juncture 176, which are prevented from moving radially outwardly by confining surface 134. The moment couples, in turn, tend to bow the arcuate portions 146 and 148 radially inwardly even though the degree of such radially inward bowing may be relatively slight. In any event, the total resilient force resisting radial outward deflection of chordal or latching portion 138 is a combination of the resilient resistance to deflection exhibited by portion 136, the effective force lever arms of the deflected portion 136 as respectively measured to the junctures 174 and 176 and the resilient resistance to inward deflection exhibited by arcuate portions 146 and 148. The same is true with respect to the other chordal sections 140 and 138 except, of course, arcuate portions 152 and 150 would not exhibit any resilient resistance toward inward bowing since such are not integrally formed to each other but rather spaced apart.

Once the shield structure is assembled, as hereinbefore described, the frictional engagement among the various cooperating elements serves to hold the shield structure 98 in any selected position relative to housing means 50. However, if it should be desired to reposition shield 98 as to re-direct the path of light rays, passing through opening 120, all that needs to be done is to firmly grasp the shield 98 and rotate it either clockwise or counter-clockwise, as viewed in FIG. 3, and thereby angularly reposition slot or cut-out 120 to, in turn, re-direct the path of light passing therethrough. Once thusly repositioned, the shield 98 will remain in such selected attitude because of the friction existing as among surfaces 62, 114 and cooperating elements 124, 164 and 128.

The entire illuminator assembly may be supported as on related support or panel means 25 and retained thereagainst as by a washer member 182 and nut 184 cooperating with threaded portion 60.

Although only a preferred embodiment of the invention has been disclosed and described it is apparent that other embodiments and modifications of the invention are possible within the scope of the appended claims.

What is claimed is:

1. In a lamp assembly, the combination comprising body means adapted to be supported by associated support means and effective for operative connection to associated bulb socket means, and light shield means for detachable connection to said body means, a first open end formed in said body means, a second open formed in said body means, clearance passage means formed through said body means and operatively interconnecting said first and second open ends, said light shield means being detachably connected to said body means as to be supported and carried thereby and effectively closing said first open end, detent-like latching means effective for detachably securing said light shield means to said body means, said second open end being adapted to have operatively connected thereto said associated bulb socket means whereby bulb means carried by said socket means extends into said clearance passage means and upon energization emits light to the interior of said light shield means, said light shield means comprising a shield main body portion, said shield main body portion comprising a generally relatively forwardly disposed first closed end and a generally relatively rearwardly disposed second end, a recesslike cavity formed in said shield main body portion, said cavity having an end opening in said rearwardly disposed second end, said end opening being effective for receiving at least a portion of said associated bulb means therein, aperture means formed in said shield main body portion as to be located generally between said first closed end and said rearwardly disposed second end, said aperture means being effective for permitting the passage therethrough of light rays generated by said associated bulb means, said latching means comprising a generally annular groove carried by said body means, a resiliently deflectable retainer member generally contained by said groove, said retainer member comprising a plurality of integrally interconnected resiliently deflectable latching portions, said retainer member when normally contained by said groove having said plurality of latching portions extending through portions of said clearance passage means, and ramp-like surface means carried by said shield main body portion, said plurality of latching portions being effective to operatively engage said ramp-like surface means and resiliently restrain the detachment of said light shield main body portion from said body means.

2. The combination of claim 1 and further comprising light ray filter means, said filter means being carried by said shield main body portion in a manner at least partly covering said aperture means.

3. The combination of claim 1 and further comprising light ray filter means, said filter means being generally tubular and carried within said cavity as to cover said aperture means, said filter means being at least translucent.

4. The combination of claim 3 wherein said filter means is retained within said cavity by an interference fit between said filter means and surface defining said cavity.

5. The combination of claim 3 wherein said filter means has an opening effective for at least partly receiving therein said associated bulb means.

6. The combination of claim 1 wherein said retainer member further comprises a plurality of joining portions, said plurality of joining portions being integrally formed with and between succeeding said latching portions.

7. The combination of claim 6 wherein said joining portions are situated radially outermost relative to the axis of said clearance passageway and effectively position said latching portions to extend transversely through said clearance passageway.

8. The combination of claim 7 wherein said joining portions are generally curvilinear as to generally conform to a radially outer portion of said annular groove containing said retainer member.

9. The combination of claim 7 wherein said latching portions when viewed in a direction parallel to said axis of said clearance passageway appear as chordal-like segments to said clearance passageway.

10. The combination of claim 9 wherein said chordal-like segments appear as generally straight-line chords.

11. The combination of claim 6 wherein said retainer member is discontinuous as to have first and second retainer ends, wherein said first and second retainer ends are spaced from each other when said retainer member is in its normal state confined by said groove, and wherein said first and second retainer ends are formed in said retainer member generally between succeeding two of said latching portions.

12. The combination of claim 11 wherein said plurality of latching portions comprise three latching portions, wherein said joining portions comprise two joining portions respectively interconnecting alternate pairs of said three latching portions, and wherein said first and second retainer ends comprise portions of said retainer member contained by said groove and resiliently tending to move radially outwardly with respect to the axis of said clearance passageway.

* * * * *